United States Patent [19]

Johnson

[11] Patent Number: 5,055,982
[45] Date of Patent: Oct. 8, 1991

[54] EXTERNAL LIGHT VISOR'S VISUAL AND APPLICATION DESIGNS

[76] Inventor: Michael B. Johnson, 40 Jerome Ave., Bloomfield, Conn. 06002

[21] Appl. No.: 499,080

[22] Filed: Mar. 26, 1990

[51] Int. Cl.⁵ ............................................. F21V 1/00
[52] U.S. Cl. ..................................... 362/61; 362/317; 362/433
[58] Field of Search ................... 362/61, 255, 64, 317, 362/433

[56] References Cited

U.S. PATENT DOCUMENTS

| | | | |
|---|---|---|---|
| 1,684,720 | 9/1928 | Wagner | 362/255 |
| 2,499,555 | 3/1950 | Wronkowski | 362/61 |
| 2,539,819 | 1/1951 | Dominick | 362/317 |
| 2,544,378 | 3/1951 | Cyr | 362/317 |
| 2,550,594 | 4/1951 | Petrakakis | 362/61 |
| 2,596,879 | 5/1956 | Warren et al. | 362/255 |
| 2,734,129 | 2/1956 | Kahla | 362/61 |
| 2,807,711 | 9/1957 | McDonald | 362/61 |
| 3,259,737 | 7/1966 | Germann | 362/317 |
| 3,696,238 | 10/1972 | Szymanski | 362/61 |
| 4,225,904 | 9/1980 | Linder | 362/61 |
| 4,310,872 | 1/1982 | Lauve | 362/64 |
| 4,439,817 | 3/1984 | Aton | 362/255 |
| 4,894,761 | 1/1990 | Gray | 362/61 |

Primary Examiner—Ira S. Lazarus
Assistant Examiner—Richard R. Cole
Attorney, Agent, or Firm—Fishman, Dionne & Cantor

[57] ABSTRACT

An optically tinted cover for a headlight of an automobile includes a sheet member for covering the headlight and a device for attaching the sheet member to the automobile.

16 Claims, 4 Drawing Sheets

EXTERNAL LIGHT VISOR'S VISUAL AND APPLICATION DESIGNS

BACKGROUND OF INVENTION

Description of Prior Art

External light visors on vehicles, particularly on automobiles, have been proven to be popular. Both the clear and smoke external visors have been widely received by the vehicle owning public.

To enable these visors to stay attached to the vehicle, a mounting technique accompanies them. Recognized primarily for either their dependability or commodious features, the drill-mount and velcro-applications seem mostly preferred by manufactures.

However, each type of visor and application method mentioned have their share of undeniable setbacks.

Presently, external light visors are mainly sold in clear or smoke tinted options. We find that with the clear external visors, only a protective aspect is provided. Their sole purpose is to safeguard external lights from potential outside elements, such as dust particles, rocks, insects, etc. Another basic characteristic provided by these visors, and external light visors, in general, are their variable reduction in the wind drag coefficient that all vehicles endure. An additional plus found are the visor's transparent character, which easily allows for full light exposure to filter through; enabling for maximum night visibility to occur. However, in the hopes of noticeability, the clear visors fail to add nothing more than sheer safety.

With the smoke tinted external light visors both the protective and wind reduction factors are also present; but unlike the clear visors, a tinted-effect is added, creating an impressive imagining projection. This additional character is the main reason behind their major success in the marketplace; all due to their unique ability of enhancing a vehicle.

Although unique in styling, a major problem is superimposed on this characteristic, that being their inability to allow enough light passage to be given off by the external lights at night. This noticeable light deficiency is directly due to the dampening action caused by the translucent tint, resulting in a considerable reduction for night visibility; greatly putting at risk both driver and surrounding elements. Having this type of negative side-effect, many states have made these visors illegal to have permanently affixed to vehicles.

Responsible for the task of keeping the external light visors attached to the vehicle, two mounting processes, the drill-mount process and the velcro-application, are found commonly in external visor purchasing packages. With the drill-mount process the visors are actually secured to the vehicle via screw-placed-brackets which are drilled into both visor and vehicle for desired positioning. With this method, an assured confidence is given to the owner against the possible loss of visors, due to their sturdiness and stability.

These two traits are very useful when it comes to having a dependable mounting procedure, successfully, stand up against the constant elements that threatens its role of reliability. Such threatening factors are a vehicle's generated vibration factor, wind resistance factor, application's design, etc.

Rewardingly, the drill-mount application executes its task effectively against such conditions. However, it does have one undeniable setback; that being, if the screw mounted brackets are inadvertently detached they will noticeably interfere with the aesthetic appearance of the vehicle.

The favorable alternative to the drill-mount process is the velcro application. In short, this convenient mounting method functions via velcro strips being mated upon attachment and unmated upon detachment. Its ability to do this is through two stationed velcro receivers adhered to the external light, which upon attachment is mated to two velcro strips adhered to visor, creating a velcro-tight bond. Upon detachment, the visors are simply removed by pulling off the visors, thus separating the velcro-bond.

This convenient option is quite useful in preventing theft or if smoke-tinted visors have to be removed, in order for full external light exposure. However, a regretful disadvantage lies with the application's design, causing an uncertainty factor to exist in the reliability of the mounting method.

One of the application's flaws lies with the trial and error installation method, which calls for the owner to totally assume the maximum bonding effect of the mated velcro-strips. However, in the event that the velcro-strips are improperly aligned, the chances of visors staying securely attached to vehicle are lessened.

A second flaw exists after replacing detached visors, the owner never really knows if the velcro-mate is properly bonded for maximum hold. Failure to achieve proper alignment of velcro-mate, may result due to previous mentioned flaw, that being the incorrect installation of velcro parts, or due to the carelessness of owner to properly secure visors to vehicle.

SUMMARY OF INVENTION

The first invention relates to an improved visual image of external light visors. This new image pertains to the various transparent mirrored-effect tints that will be featured on the visors.

Uridium tint, commonly found in ski-glasses, will be a major candidate for achieving both singular and combinational mirrored colored-effect tints. For instance, such singular colored tints, aside from silver and gold colored, will be yellow, green, orange, etc. Examples of the combinational mirrored tint will be yellow/silver, orange/gold mirrored, etc.

To compensate for the sunglare factor, possibly induced by the visors, cleverly, both convexed and inclined surfaces will be incorporated in the actual outer-exterior of the visors.

The second invention will relate to an improvement on present external light visor's mounting processes. Working, ideally, in tandem with the external light visors, the "spade application" was developed. This application method conveniently combines only the strong characteristics of its predecessors into one unique system. More specifically, combining the security existent of a drill-mount procedure., along with the useful option of removing and replacing easily, similarly found with the velcro application. These desired forces will be readily available at its owner's disposal, activated, merely, with a simple snap.

In the following two inventions we will see a first in conceptual designs for both the visual image and mounting applications, as they relate to external light visors. In the first invention, an external light visor having the characteristic of photochromicity, better known as photogray, will govern the situational behavior of the visors. These specially developed visors will have a tinted appearance during day time situations, and metamorphically change totally clear for night time scenarios. With these special tendencies, the previously illegal tinted external light visor can now be permanently legalized. Available in both smoke and various mirrored-effect tints, the visors will no longer need to be removed for visual safety reasons; now, allowing for external light visors to be permanently affixed to vehicle through whatever means most reliable.

In the second invention of this group, the retractable light visor is introduced. This visor will basically behave in a similar sense that the photochromic visors will, that being both will optimize the safety of the driver for night time situations, along with offering an unique appearance to their vehicles during the day, jeopardizing nothing in the crossover.

The retractable visors, during the day, will be fully exposed on the vehicle, displaying whichever visual image that the owner decides. However, with the occurrence of a night time scenario, the visors will be automatically or manually retracted into the vehicle, bringing forth full light exposure for maximum visibility.

Additionally, these visors will benefit from a fortunate reduction in regards to thievery, due to the retractable visor's internal-storing characteristic.

Never before were optimum safety and a stylish appearance combined in an external visor, fortunately now there is such a product.

BRIEF DESCRIPTION OF DRAWINGS

The features of the invention will now be described with reference to the drawings of the preferred embodiment, which is intended to illustrate, and not to limit, the invention, and in which.

ADDITIONAL INFORMATION

In order to exemplify the possible options responsible for attaining the colored mirrored-effect, brochures of different types of colored sunglasses are included.

DESCRIPTION OF PREFERRED EMBODIMENTS

Figure 1:
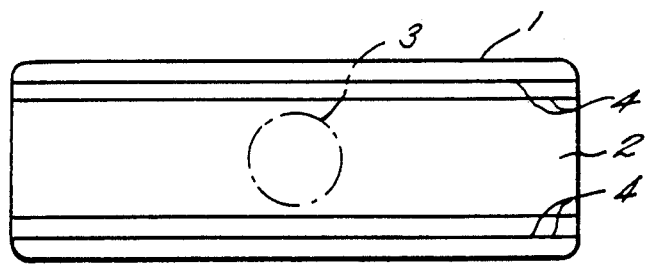
FIG. 1 shows a front view of a visor of the present invention.

Referring to FIG. 1, an external light visor 1, is shown with mirrored-effect tint, emblem label 3, stripping 4 (optional).

Figure 2:
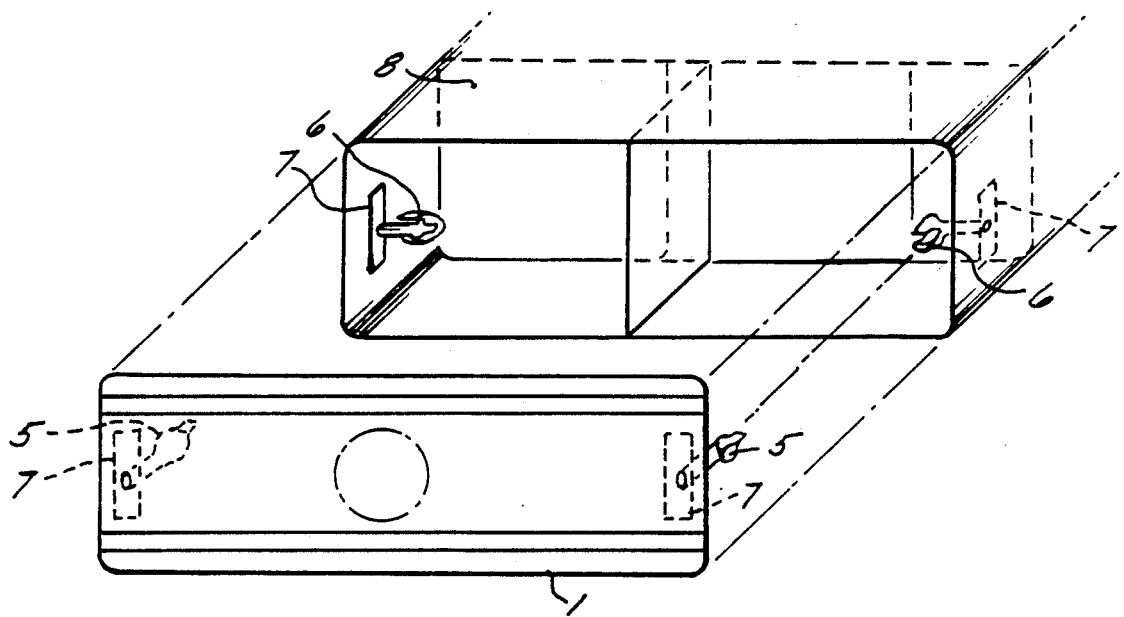
FIG. 2 shows a partially exploded perspective view of a visor of the present invention and a headlight.
Figure 3:
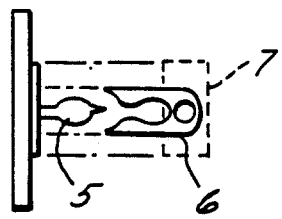
FIG. 3 shows a side view of the fastener shown inn FIG. 2.

FIGS. 2 and 3, the "Spade Application" 5 and 6, is shown in junction with external visor 1.

Spade application 5 and 6 is only applicable to vehicles having headlight ports, 8. Visor 1, is seen having a pair of spaded-shaped pins 5, secured to its backside by means of a strong adhesive tape, which adheres to visor 1, and the spaded pin's base 7.

Similarly, inside the headlight port 8, the spade receiver 6, is secured to the side of port 8 by an adhesive tape located on the base of the spade receiver 7.

Upon insertion of the spaded-pin 5 into the spade receiver 6, it is important to note the specifications in which the spaded-pin's 5 curvature must meet in order to enable a snap fitting and at the same time be able to detach easily. The side view of Diagram B carefully depicts this precaution.

Figure 4:
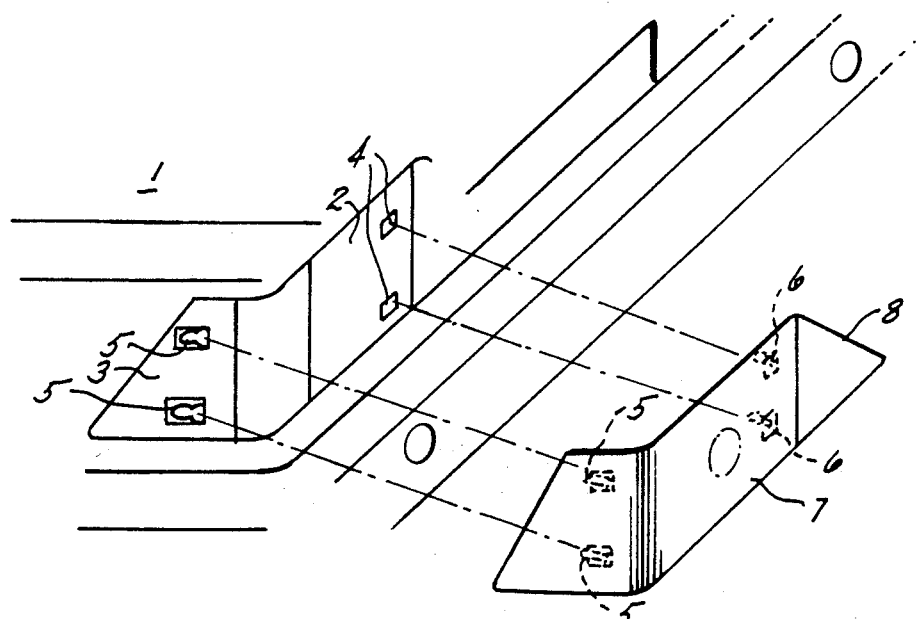
FIG. 4 and 5 show partially exploded perspective views of two respective embodiments of the visor of the present invention and an automobile taillight.
Figure 6:
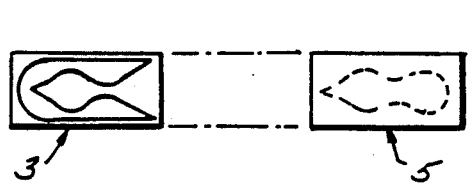
FIG. 6 shows a side view of the fastener device shown in FIG. 4.
Figure 7:
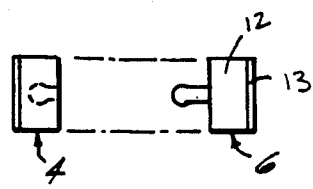
FIG. 7 shows a side view of a fastener device shown in FIG. 5.

Referring to FIG. 4 the front of a vehicle 1 is shown. In this spade application, two sets of clips 3 and 4 are placed at opposite ends of the headlight 2. Their mating pins 5 and 6, respectively, are located on visor 8. They are secured to their designations via strong adhesive tape 13 on their bases 12, as shown in FIGS. 6 and 7. Upon insertion of visor 8 to headlight 2, the clips 3 and 4, and pins 5 and 6, respectively, will mate and create a secure housing 14 and 15 to keep visor 8 safely in place.

Figure 5:
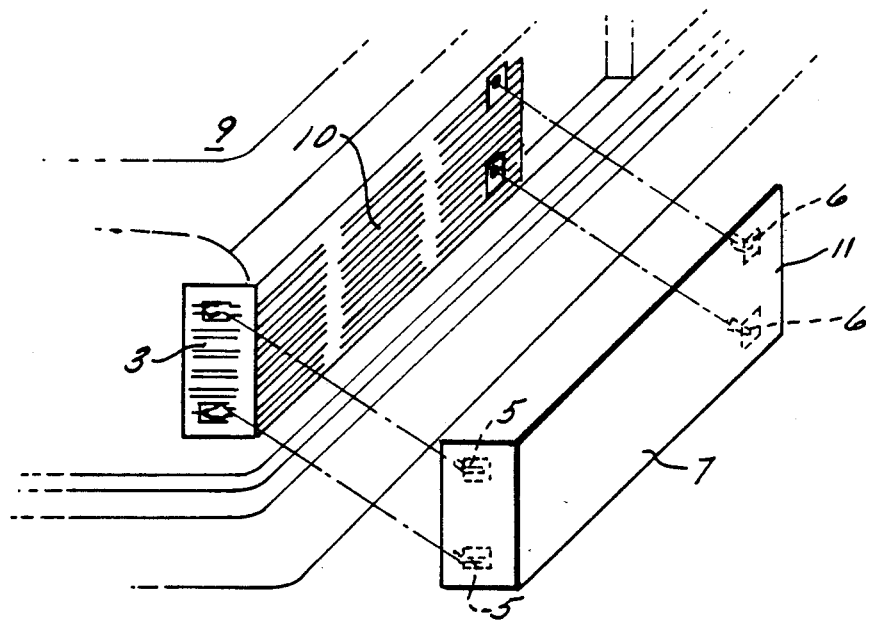

In reference to FIG. 4, FIG. 5's depiction of securing the rear visor 11 to taillight 10 at the rear of the vehicle 9, is identically the same.

Figure 8:
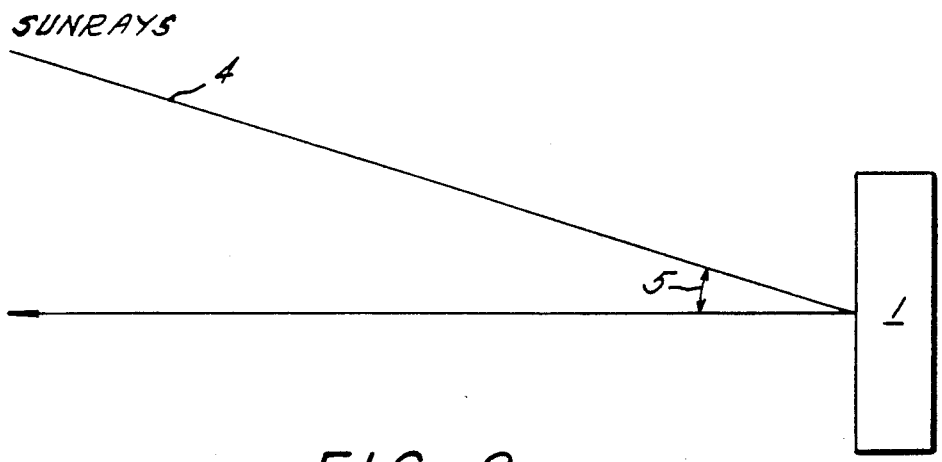
FIGS. 8, 9 and 10 are schematic diagrams of deflection of an incident light ray by three respective embodiments of the present invention.
Figure 9:
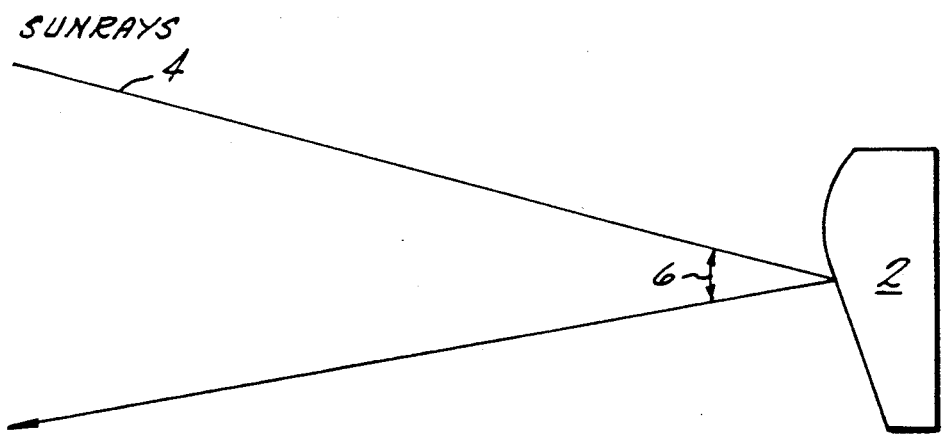
Figure 10:
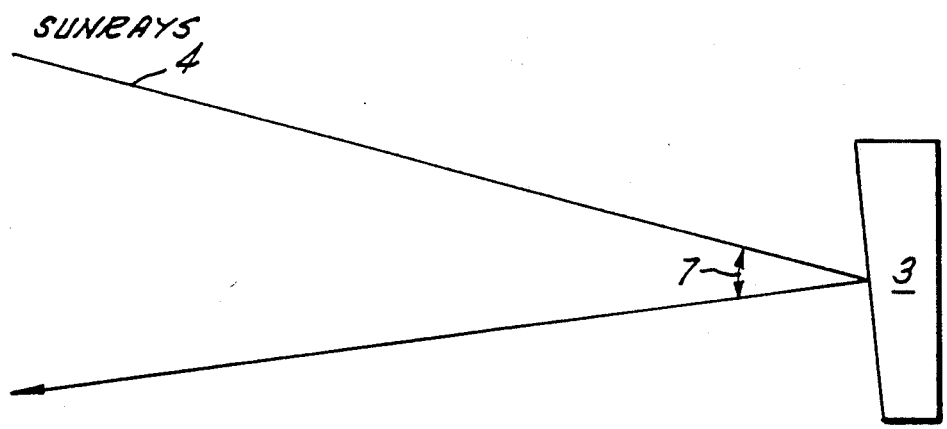
Figure 11:
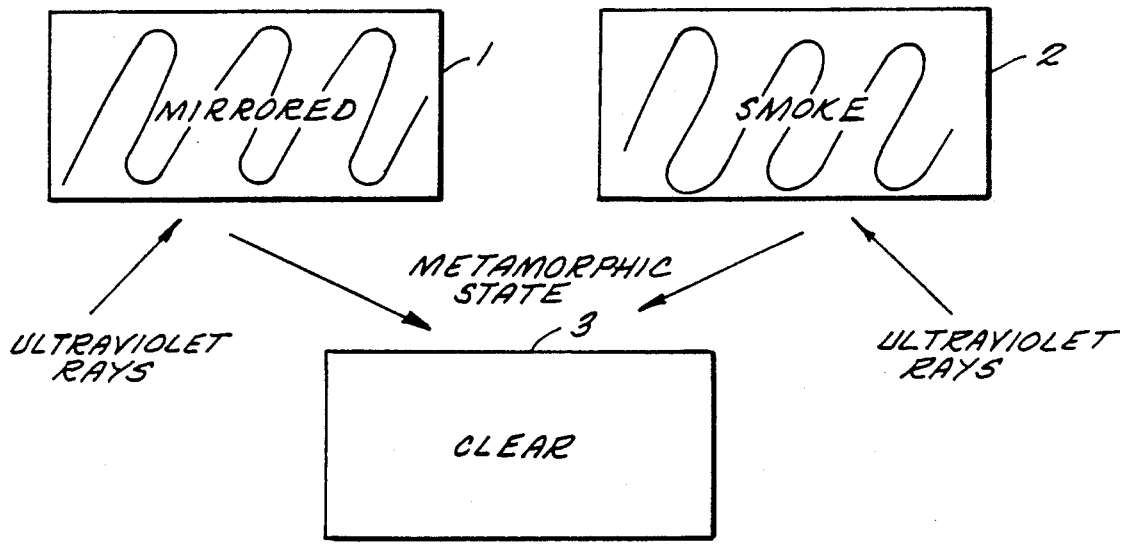
FIG. 11 shows a schematic diagram of the response of one embodiment of the present invention of ultraviolet radiation.

Referring to FIGS. 8, 9 and 10, part A, we see a side view of a presently made external light visor 1. Due to its perpendicular angled surface, when direct sunlight 4 deflects off of a mirrored external visor 1, a straight aimed sunglare may result due to their reflective angle of inclination 5.

However in Part B, the angle of inclination 6, generated by the convexed visors 2, reflects sunrays 4 in a downward direction, preventing the sunglare factor to be obstructive to an oncoming driver's vision.

In a similar manner, Part C's, inclined visors 3 reflects sunrays 4 in a downward direction 7 as well.

Referring to FIGS. 7-11, the "photochromic external visors" shown, will yield its tinted state 1 and 2 to obtain a clear state 3 upon the delinquent absorption of ultra violet rays. Conversely, to transform from the clear visors 3 to the tinted state 1 and 2, an adequate absorption of ultraviolet rays will have to result, achieving a complete transformation, on an average elapsed time of 5 minutes.

Figures 12, 13:
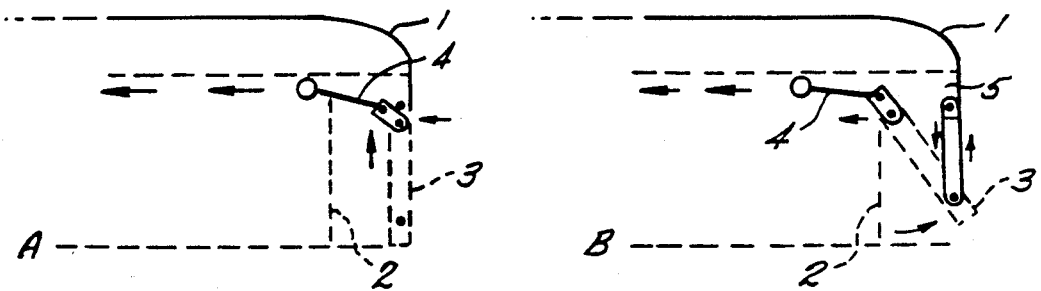
FIGS. 12, 13 and 14 show schematic cross sectional views of an embodiment of the cover of the present invention which include a device for pivotably mounting the cover on an automobile.
Figure 14:
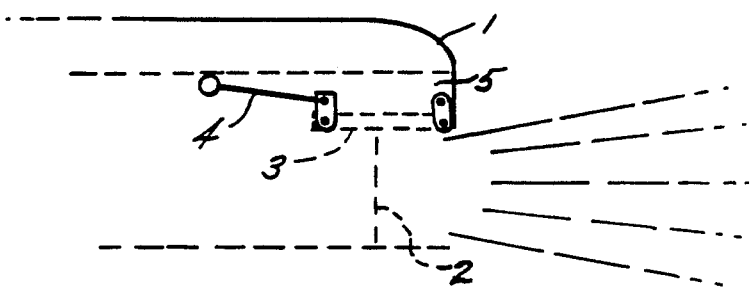

Referring to the front of vehicle 1, in FIGS. 12, 13 and 14, part A, a visor 3 is shown externally secured by way of a pre-activated rotational engaging means 4. Upon activation, the rotational engaging means 4 will gradually pivot visor 3 on a horizontal rotational axis, as depicted in Diagram H Part B. Helping assist the rotational engaging means 4 in guiding, the partially viewed visors 3, on its clockwise rotational direction, a pivotal support member 5 is activated also. Consequently, as a result of both the rotational engaging means 4 and the pivotal support member 5 being activated, the visors 3 will successfully be internally stored. Thus, leaving the headlights 2 fully exposed for night situations.

Although various detailed embodiments of specific inventions are illustrated in the drawings and previously described in detail, these inventions contemplates any configuration, design and relationship of components which will provide the equivalent result.

I claim:

1. A cover for a headlight of an automobile, comprising:

photochromic sheet means for covering the headlight, said photochromic sheet means being optically transparent in the absence of sunlight and said photochromic sheet means exhibiting a darkened appearance if exposed too sunlight; and attachment means for securing the photochromic sheet means to the automobile.

2. The cover of claim 1, wherein the cover comprises glass.

3. The cover of claim 1, wherein the cover comprises a synthetic polymer.

4. The cover of claim 1, wherein the cover exhibits a dark gray pigmentation when the cover is exposed to sunlight.

5. The cover of claim 1, wherein the sheet means includes a back surface and the attachment means comprises a plurality of pins projecting rearwardly from the back surface of the sheet means.

6. The cover of claim 1, wherein the attachment means further includes pin receiving means for snap lockedly receiving the plurality of pins, and adhesive means for mounting said pin receiving means on said automobile.

7. The cover of claim 1, wherein the attachment means includes means for pivotably mounting the cover so that the cover may be pivotably displaced to expose the headlight.

8. A cover for a headlight of an automobile, comprising:

an optically tinted sheet member for covering the headlight, said sheet member extending from a top end to a bottom end and further including a planar back surface and a planar front surface extending downwardly and backwardly from the top end at a nonzero angle relative to the back surface; and attachment means for securing the sheet member to the automobile.

9. The cover of claim 8, wherein the cover comprises glass.

10. The cover of claim 8, wherein the cover comprises a synthetic polymer.

11. The cover of claim 8, wherein the sheet member exhibits a mirrored appearance.

12. The cover of claim 8, wherein the sheet member exhibits a colored appearance.

13. The cover of claim 8, wherein the sheet members exhibits a mirrored and colored appearance.

14. The cover of claim 8, wherein the sheet means includes a back surface and the attachment means comprises a plurality of pins projecting rearwardly from the back surface of the sheet means.

15. The cover of claim 14, wherein the attachment means further includes pin receiving means for snap lockedly receiving the plurality of pins, and adhesive means for mounting said pin receiving means on said automobile.

16. The cover of claim 8, wherein the attachment means includes means for pivotably mounting the covers so that the cover may be pivotably displaced to expose the headlight.

* * * * *